US010661769B2

(12) United States Patent
Czaja et al.

(10) Patent No.: US 10,661,769 B2
(45) Date of Patent: May 26, 2020

(54) METHOD FOR CONTROLLING BRAKES

(71) Applicant: WABCO GmbH, Hannover (DE)

(72) Inventors: Daniel Czaja, Hannover (DE); Hauke Diers, Lehrte (DE); Axel Stender, Hameln (DE)

(73) Assignee: WABCO GmbH, Hannover (DE)

( * ) Notice: Subject to any disclaimer, the term of this patent is extended or adjusted under 35 U.S.C. 154(b) by 85 days.

(21) Appl. No.: 15/770,382

(22) PCT Filed: Aug. 19, 2016

(86) PCT No.: PCT/EP2016/001411
§ 371 (c)(1),
(2) Date: Apr. 23, 2018

(87) PCT Pub. No.: WO2017/067622
PCT Pub. Date: Apr. 27, 2017

(65) Prior Publication Data
US 2018/0312148 A1 Nov. 1, 2018

(30) Foreign Application Priority Data
Oct. 23, 2015 (DE) .................. 10 2015 013 761

(51) Int. Cl.
*B60T 8/24* (2006.01)
*B60T 8/18* (2006.01)
*B60T 7/20* (2006.01)
*B60T 8/17* (2006.01)
(Continued)

(52) U.S. Cl.
CPC .............. *B60T 8/243* (2013.01); *B60T 7/20* (2013.01); *B60T 8/176* (2013.01); *B60T 8/1708* (2013.01);
(Continued)

(58) Field of Classification Search
CPC ........ B60T 8/243; B60T 8/323; B60T 8/1708; B60T 8/248; B60T 8/1887; B60T 7/20; B60T 2230/06; B60T 2240/00
See application file for complete search history.

(56) References Cited

U.S. PATENT DOCUMENTS 6,176,555 B1    1/2001   Semsey
7,311,364 B2 *  12/2007  Robertson ................ B60T 7/20
                                                          303/20
(Continued)

FOREIGN PATENT DOCUMENTS

DE    19602879 C1    8/1997
DE    10026688 C1    9/2001
(Continued)

OTHER PUBLICATIONS

PCT/EP2016/001411 International Search Report dated Nov. 28, 2016, 3 pages.
(Continued)

*Primary Examiner* — Michael J Zanelli
(74) *Attorney, Agent, or Firm* — Warner Norcross + Judd LLP

(57) ABSTRACT

Disclosed is a method for automatically controlling brakes in a trailer vehicle having antilock control, wherein wheel rotational speeds are continuously monitored and evaluated at wheels having antilock control. According to the method, lateral acceleration and longitudinal acceleration of the trailer vehicle are determined. If a predefined, critical lateral acceleration is exceeded, an automatic braking process occurs. A control unit and trailer vehicle are also disclosed in connection with the inventive method.

8 Claims, 3 Drawing Sheets

(51) Int. Cl.
*B60T 8/1755* (2006.01)
*B60T 8/176* (2006.01)
*B60T 8/32* (2006.01)
*B60T 8/58* (2006.01)
*B60T 8/72* (2006.01)

(52) U.S. Cl.
CPC ........ *B60T 8/17554* (2013.01); *B60T 8/1887* (2013.01); *B60T 8/248* (2013.01); *B60T 8/323* (2013.01); *B60T 8/58* (2013.01); *B60T 8/72* (2013.01); *B60T 2230/03* (2013.01); *B60T 2230/06* (2013.01); *B60T 2240/00* (2013.01); *B60T 2250/00* (2013.01); *B60T 2270/10* (2013.01)

(56) References Cited

U.S. PATENT DOCUMENTS 8,359,146 B2 * 1/2013 Amato .................. B60T 8/1708
                                                          701/70

2001/0037677 A1 11/2001 Holst et al.
2003/0127910 A1 7/2003 Frank
2003/0225499 A1 12/2003 Holler
2005/0060082 A1 3/2005 Heuer et al.
2014/0214299 A1 7/2014 Risse et al.

FOREIGN PATENT DOCUMENTS

| | | |
|---|---|---|
| DE | 10017045 A1 | 10/2001 |
| DE | 102011111862 A1 | 2/2013 |
| EP | 1142768 A2 | 10/2001 |
| GB | 2454224 A | 5/2009 |
| GB | 2499438 A | 8/2013 |
| JP | 2000043695 A | 2/2000 |

OTHER PUBLICATIONS

English language abstract and machine translation for JP2000043695 (A) extracted from http://worldwide.espacenet.com database on May 2, 2018, 24 pages.

* cited by examiner

METHOD FOR CONTROLLING BRAKES

CROSS-REFERENCE TO RELATED APPLICATIONS

This application is the National Stage of International Application No. PCT/EP2016/001411, filed on 19 Aug. 2016, which claims priority to and all advantages of German Patent Application No. 10 2015 013 761.1, filed on 23 Oct. 2015, the content of which is hereby incorporated by reference.

FIELD OF THE INVENTION

The invention generally relates to a method for the automatic actuation of brakes and, more specifically, for the automatic actuation of brakes in a trailer vehicle with antilock control. The invention also relates to a trailer vehicle with a brake system for carrying out the method to and a control unit for the same.

BACKGROUND OF THE INVENTION

Utility vehicles are typically equipped with a pneumatic brake system and an electronic brake system. This means that a brake signal is sent electronically to a control unit by a driver. The control unit controls valves with which brake pressure in vehicle brakes is controlled. All kinds of sensors and additional functions are associated with the control unit. For example, stability control can be provided, namely control against tipping over because of excessively rapid cornering. The combination of a pneumatic brake system and an electronic brake system is also known for trailer vehicles.

In electronic brake systems, a low test brake pressure is controlled on the side of the vehicle on the inside of the turn for verifying the risk of tipping over. If the low test brake pressure is sufficient to lock wheels on the side of the vehicle on the inside of the turn, it is assumed therefrom that the load on the side of the vehicle on the inside of the turn is highly reduced and there is a risk of tipping over. The vehicle is then automatically fully braked to reduce the speed and thus to prevent tipping over. In this case, the test brake pressure is calculated as a function of a loading, so that the wheels on the inside of the turn lock at approx. 90% load reduction, starting from a relatively high coefficient of friction between the tires and the road. Detection of the axle loads by sensors and relatively accurate delivery of the test brake pressure are necessary for this purpose. Both are typically not provided for simple brake systems without an electronic brake system.

The forerunner of the electronic brake system was so-called antilock control without electronic transmission of the brake signal from the driver to the control unit. The control unit only had the task of monitoring signals of the wheel revolution rate sensors and reducing the effective brake pressure for locking wheels. Furthermore, trailer vehicles with antilock control and without an electronic brake system are widespread.

SUMMARY OF THE INVENTION

It is an object of the present invention to provide a method with which a trailer vehicle with antilock control, i.e. in particular without an electronic brake system, can be protected against tipping over in turns that are otherwise taken too fast.

The method comprises:
a) monitoring a lateral acceleration $a_Q$ and a longitudinal acceleration $a_L$ of the trailer vehicle,
b) on exceeding a predefined, critical lateral acceleration $a_{Qkrit}$ in a turn, carrying out an automatic braking process with the following procedure:
 b1) increasing a brake pressure on a side of the vehicle on the inside of the turn, optionally in small steps of, for example, 0.1-0.2 bar,
 b2) in each step, checking whether a longitudinal acceleration limit $a_{Lkipp}$ is reached, and
 b3) in each step, checking whether wheels on the inside of the turn lock or the antilock control for wheels on the inside of the turn engages, wherein
  b31) if wheels on the inside of the turn lock or the antilock control engages for wheels on the inside of the turn before $a_{Lkipp}$ is reached, then the method further comprises deceleration braking at least on a side of the vehicle on the outside of the turn, and
  b32)—if $a_{Lkipp}$ is reached without wheels on the inside of the turn locking or the antilock control engaging for wheels on the inside of the turn, then the method further comprises terminating the braking process.

The lateral acceleration is typically continuously monitored by determining and comparing the same with the critical lateral acceleration at very short time intervals. The longitudinal acceleration is typically only determined if the critical lateral acceleration is exceeded, but can also be determined independently thereof.

A control unit with a lateral acceleration sensor can be provided for determining the lateral acceleration for the antilock control. The longitudinal acceleration can be determined from the signals of the wheel revolution rate sensors in any known way. Alternatively, a longitudinal acceleration sensor can be provided for detection of the longitudinal acceleration. In this case, a downslope or an upslope of a road is typically detected before the start of the braking process and is factored out during the braking process.

Once there is a lateral acceleration, traversing a turn is assumed. The lateral acceleration is always oriented outwards, i.e. opposite to a direction into the turn.

The critical lateral acceleration $a_{QKRIT}$ is calculated from the design of the vehicle and/or determined from empirical values. Similarly, a limit value $a_{LKIPP}$ for a longitudinal acceleration is determined from empirical values or from the design of the vehicle. The object is a longitudinal acceleration limit $a_{LKIPP}$ so that a risk of tipping over is detected if an axle load on the side on the inside of the turn is less than 10% of the maximum axle load at this point. Assuming a road train with a towing vehicle and a trailer with 4 and 6 wheels for example, the 3 wheels of the trailer of the road train on the inside of the turn should decelerate by about 2.4%. This is the percentage value of the braking force related to the wheel loading. This means that $a_{Lkipp}$ should be about 2.4%. For a road train with more wheels on the towing vehicle and fewer wheels on the trailer (6+4 instead of 4+6), at 1.6% a lower value for $a_{Lkipp}$ results. $a_{Lkipp}$ typically lies between 1.5% and 3%.

A particular advantage of the method according to the invention is that additional sensing .of the loading or the axle loads is not necessary, and thus the method can also be used for conventional vehicles with antilock control and without an electronic brake system. Moreover, the method can be used for vehicles with electronic brake systems but without load sensors. Finally, the method can also be used in vehicles with load sensors if the signals of the load sensors fail or should not be used.

According to certain embodiments of the invention, deceleration braking that is started according to step b.3.1. is terminated once the lateral acceleration $a_Q$ is less than a critical lateral acceleration $a_{QKRIT}$. The risk of tipping over is then eliminated. The deceleration braking does not have to be continued. Then the entire cycle may start from the beginning with monitoring of the lateral acceleration $a_Q$ and the longitudinal acceleration $a_L$.

In these or other embodiments, following termination of the braking process according to step b.3.2., the automatic braking process according to b is only initiated again, if the lateral acceleration $a_Q$ is rising again and lies above the critical lateral acceleration $a_{QKRIT}$ by a defined amount, or if the vehicle has travelled a defined distance since the last braking process according to b and the lateral acceleration $a_Q$ is still greater than the critical lateral acceleration $a_{QKRIT}$.

The brake pressure is increased on the side of the vehicle on the inside of the turn in stages. During each stage, a brake pressure is controlled over a defined period of time. The period of time is referred to as the control time of the brake pressure for pulsing and in specific embodiments lies at about five to ten milliseconds. The period of time is determined from parameters of the design of the vehicle or is determined based on empirical values.

The subject matter of the invention is thus a trailer vehicle with a brake system for carrying out the method described above. The brake system and the trailer vehicle are equipped with a control unit that comprises software necessary for carrying out the method and optionally the functionality of an antilock control or even an electronic brake system.

BRIEF DESCRIPTION OF THE DRAWING

The invention is described in greater detail below with reference to the accompanying figures, in which.

DETAILED DESCRIPTION

Figure 1:
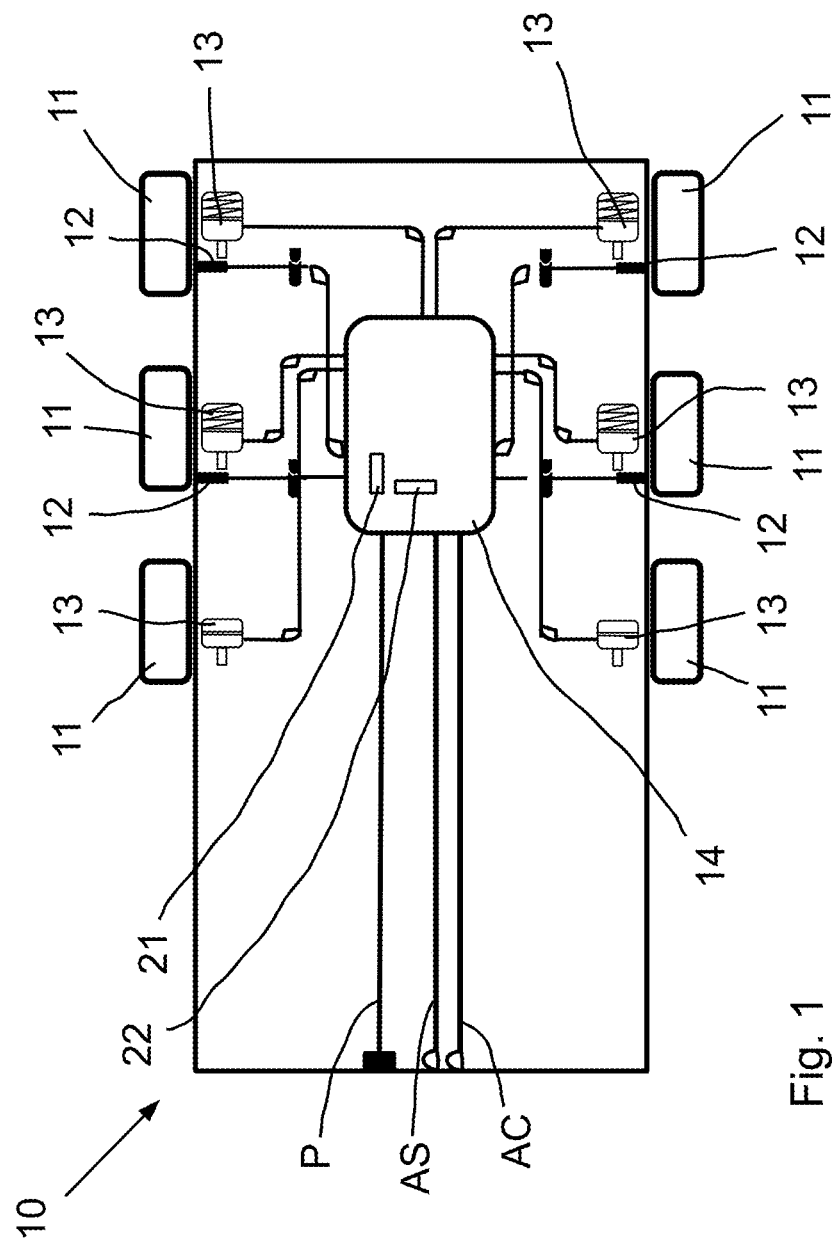
FIG. 1 shows the schematic representation of a pneumatic brake system of a trailer vehicle (trailer) with three axles.

With reference to the specific embodiments of the Figures, wherein like numerals generally indicate like parts throughout the several views, a trailer vehicle is generally shown at 10. A trailer vehicle 10 of the trailer type comprises a pneumatic brake system with an anti-lock function. On four of six wheels 11 (two of three axles), wheel revolution rate sensors 12 are provided. The operation of brake cylinders 13 is controllable by a control unit 14. An electrical line P, a pneumatic pressure line AS and a pneumatic control line AC are connected to the control unit 14.

Figure 2:
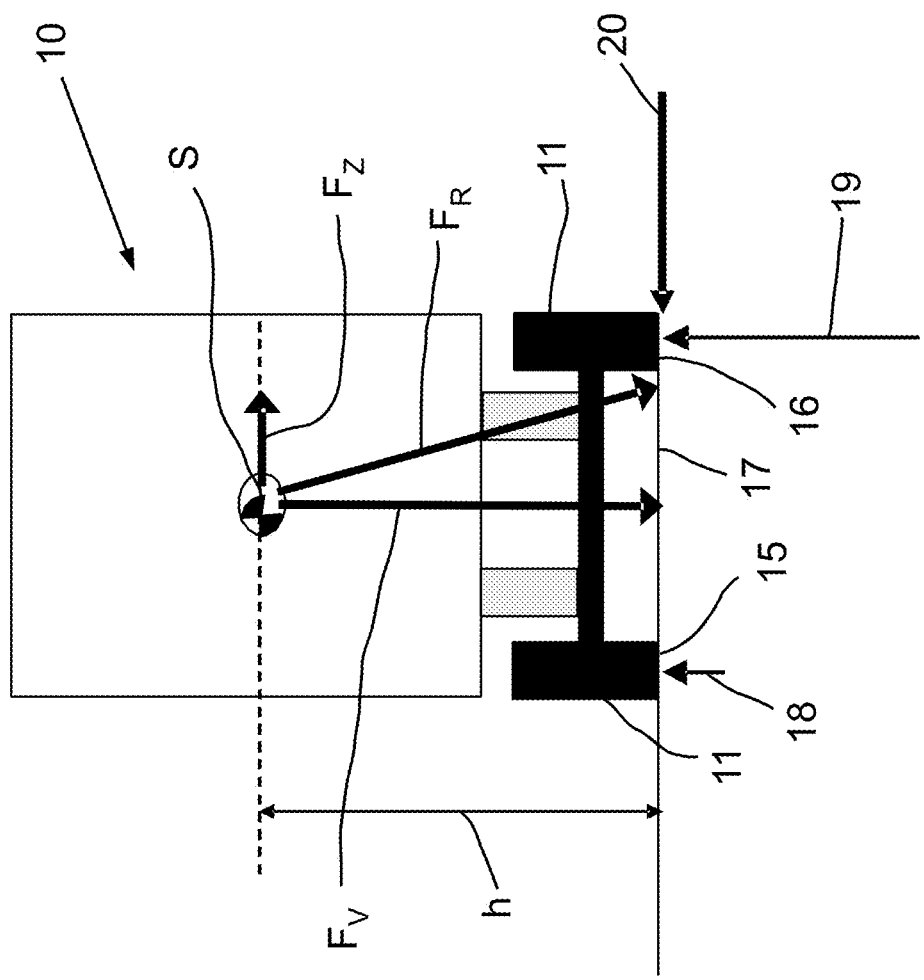
FIG. 2 shows the trailer vehicle in rear view with a representation of the forces in a left turn.
Figure 3:
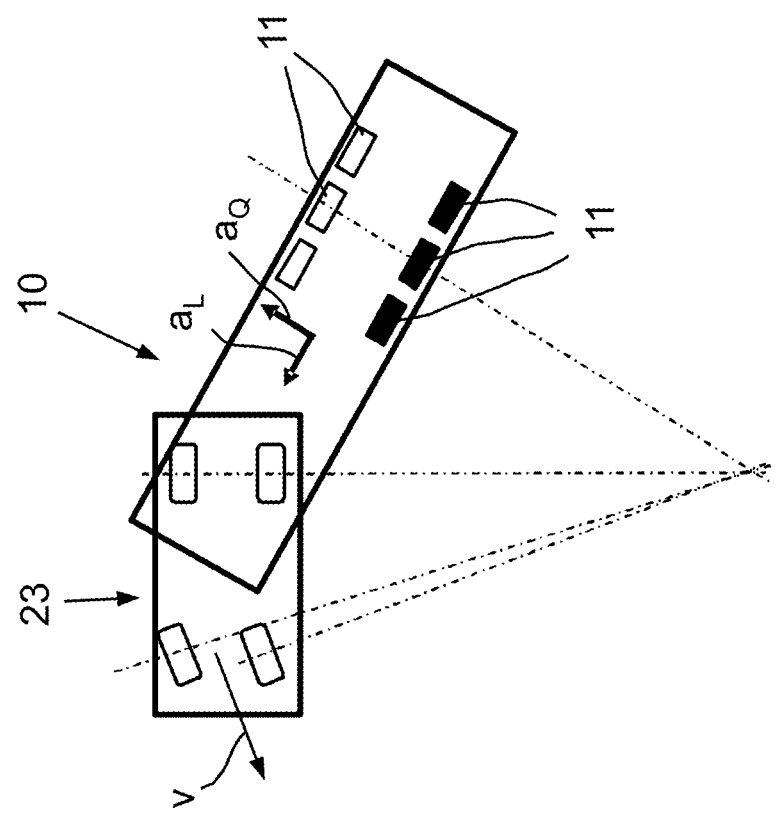
FIG. 3 shows a schematic top view of the trailer vehicle with a towing vehicle while traversing a left turn.

In the case of fast cornering and/or a relatively high center of gravity S of the trailer vehicle 10, there is a risk of tipping over. Assuming a height h or a position of the center of gravity S, a centrifugal force $F_Z$ and a load-dependent, vertically oriented gravitational force $F_V$, there is a resulting force $F_R$, see FIG. 2. Corresponding forces occur in the region of contact surfaces 15, 16 between the wheels 11 and the road 17, see arrows 18 (left contact force), 19 (right contact force) and 20 (cornering force). It can be seen that for increasing centrifugal force $F_Z$, the resultant force $F_R$ deviates ever more from the vertical force $F_V$ and is smaller according to the left contact force (arrow 18). In the extreme case, the left contact force changes sign and the trailer vehicle 10 tips over.

In order to avoid tipping over when traversing a turn, a longitudinal acceleration $a_L$ and a lateral acceleration $a_Q$ are continuously detected, in particular by sensors 21, 22 disposed in the control unit 14. Alternatively or additionally, the lateral acceleration $a_Q$ can be determined from the different revolution rates of the wheels 11 on the inside of the turn and on the outside of the turn. Similarly, the longitudinal acceleration $a_L$ can be alternatively or additionally determined from the change of the wheel revolution rates.

A vehicle combination consisting of a towing vehicle 23 and a trailer vehicle 10 is driving for example at a speed of v=60 km/h in a turn. The lateral acceleration of the vehicle $a_Q$ is monitored continuously, as is the longitudinal acceleration of the vehicle $a_L$. A tipping-over-critical lateral acceleration $a_{QKRIT}$ is determined from the design of the vehicle and/or from empirical values. Similarly, a limit value $a_{LKIPP}$ for a longitudinal acceleration is determined from empirical values or from the design of the vehicle. The following shall apply here:

$a_{QKRIT}$=3 m/s$^2$ $a_{LKIPP}$=0.24 m/s$^2$ (or 0.16 m/s$^2$ for a trailer with two axles, as in North America).

On exceeding the tipping-over-critical lateral acceleration $a_{QKRIT}$, an automatic braking process is triggered. This consists of test brakings with brake pressure increasing in stages. The brake pressure is introduced in pulses into the brake cylinder. For each pulse, a period of time of about five to ten milliseconds is used in specific embodiments. Other values can result from the design of the vehicle and the reaction times of the components participating in the braking process. Depending on the steering angle and center of gravity for a given speed v of 60 km/h, the following processes result:

Process 1

The control unit 14 determines a lateral acceleration $a_Q$ of more than 3 m/s$^2$. The tipping-over-critical lateral acceleration $a_{QKRIT}$ is thus exceeded. The automatic braking process is triggered and the brake pressure on the side on the inside of the turn (contact surface 15 and arrow 18 in FIG. 2) is increased in defined steps, in particular in about 0.1 bar-steps. In the usual anti-lock controllers, increasing the brake pressure can be controlled via actuation times of inlet magnets on control valves. At the same time, the longitudinal acceleration $a_L$ is monitored. In this case, a negative longitudinal acceleration $a_L$ is determined, the magnitude of which is greater than the predetermined longitudinal acceleration limit $a_{LKIPP}$. This means that owing to the automatic braking process of the wheels on the inside of the turn, the trailer vehicle decelerates more than specified by the longitudinal acceleration limit $a_{LKIPP}$. The wheels on the inside of the turn do not lock. Thus, the decelerated wheels on the side on the inside of the turn still have sufficient contact force. There is no risk of tipping over. The automatic braking process is terminated. The last measured or calculated lateral acceleration $a_Q$ is stored until further notice, however.

Should the lateral acceleration $a_Q$ increase further, for example by a defined difference or by 5% to 10%, an automatic braking process takes place again.

Process 2

As in process 1, the measured or calculated lateral acceleration $a_Q$ is greater than the critical lateral acceleration $a_{QKRIT}$. Brake pressure is increased in pulses, in specific embodiments in 0.1 bar steps, on the side on the inside of the turn. In contrast to process 1, a significantly lower negative longitudinal acceleration $a_L$ is now measured or calculated during the automatic braking process. The magnitude of the longitudinal acceleration $a_L$ is thus smaller than the limit value $a_{LKIPP}$ of 0.24 m/s². This case can for example occur if the vehicle has a center of gravity lying higher than in process 1. The adhesion to the road surface of the wheels on the inside of the turn is still only low. The wheels on the inside of the turn do not have sufficient contact force and lock, or antilock control engages for the wheels on the inside of the turn. As a result, deceleration braking is initiated for the trailer vehicle 10, at least for the wheels on the outside of the turn, in particular for all wheels. Owing to the deceleration braking, the lateral acceleration $a_Q$ reduces to below the critical lateral acceleration $a_{QKRIT}$. The braking process is then terminated, because the vehicle is stable again. The process can start from the beginning again, depending on the determined lateral acceleration $a_Q$.

Process 3

The measured/calculated lateral acceleration $a_Q$ of the vehicle lies below the critical lateral acceleration $a_{QKRIT}$ of 3 m/s². This case can occur in turns with a larger radius or in the case of a very low center of gravity of the vehicle. No automatic braking process takes place.

The terms "comprising" or "comprise" are used herein in their broadest sense to mean and encompass the notions of "including," "include," "consist(ing) essentially of," and "consist(ing) of. The use of "for example," "e.g.," "such as," and "including" to list illustrative examples does not limit to only the listed examples. Thus, "for example" or "such as" means "for example, but not limited to" or "such as, but not limited to" and encompasses other similar or equivalent examples. The term "about" as used herein serves to reasonably encompass or describe minor variations in numerical values measured by instrumental analysis or as a result of sample handling. Such minor variations may be in the order of ±0-25, ±0-10, ±0-5, or ±0-2.5, % of the numerical values. Further, The term "about" applies to both numerical values when associated with a range of values. Moreover, the term "about" may apply to numerical values even when not explicitly stated.

Generally, as used herein a hyphen "-" or dash "—" in a range of values is "to" or "through"; a ">" is "above" or "greater-than"; a "≥" is "at least" or "greater-than or equal to"; a "<" is "below" or "less-than"; and a "≤" is "at most" or "less-than or equal to." On an individual basis, each of the aforementioned applications for patent, patents, and/or patent application publications, is expressly incorporated herein by reference in its entirety in one or more non-limiting embodiments.

It is to be understood that the appended claims are not limited to express and particular compounds, compositions, or methods described in the detailed description, which may vary between particular embodiments which fall within the scope of the appended claims. With respect to any Markush groups relied upon herein for describing particular features or aspects of various embodiments, it is to be appreciated that different, special, and/or unexpected results may be obtained from each member of the respective Markush group independent from all other Markush members. Each member of a Markush group may be relied upon individually and or in combination and provides adequate support for specific embodiments within the scope of the appended claims.

The present invention has been described herein in an illustrative manner, and it is to be understood that the terminology which has been used is intended to be in the nature of words of description rather than of limitation. Many modifications and variations of the present invention are possible in light of the above teachings. The present invention may be practiced otherwise than as specifically described within the scope of the appended claims. The subject matter of all combinations of independent and dependent claims, both single and multiple dependent, is herein expressly contemplated.

What is claimed is:

1. A method for the automatic actuation of brakes in a trailer vehicle with antilock control, wherein wheel revolution rates on wheels with antilock control are continuously monitored and analyzed by the trailer vehicle, said method comprising:
   a) determining a lateral acceleration $a_Q$ and a longitudinal acceleration $a_L$ of the trailer vehicle,
   b) on exceeding a predefined, critical lateral acceleration $a_{Qkrit}$, carrying out an automatic braking process comprising:
      b1) increasing a brake pressure on a side of the trailer vehicle on an inside of a turn incrementally over a plurality of pressure steps,
      b2) checking in each of the plurality of pressure steps whether a longitudinal acceleration limit $a_{Lkipp}$ is reached, and
      b3) checking in each of the plurality of pressure steps whether wheels on the inside of the turn lock or the antilock control engages for wheels on the inside of the turn, wherein
         b31)—if wheels on the inside of the turn lock or the antilock control engages for wheels on the inside of the turn before $a_{Lkipp}$ is reached, the method further comprises starting deceleration braking at least on a side of the trailer vehicle on an outside of the turn, and
         b32)—if $a_{Lkipp}$ is reached without wheels on the inside of the turn locking or the antilock control engaging for wheels on the inside of the turn, the method further comprises terminating the braking process.

2. The method as claimed in claim 1, wherein deceleration braking according to step b31 is terminated once the lateral acceleration $a_Q$ is less than a critical lateral acceleration $a_{QKRIT}$.

3. The method as claimed in claim 1, wherein after terminating the braking process according to step b32, the automatic braking process is only initiated again according to b,
   if the lateral acceleration $a_Q$ has continued to increase and exceeds the critical lateral acceleration $a_{QKRIT}$ by a defined magnitude, or
   if the trailer vehicle has travelled a defined distance since the last braking process according to b and the lateral acceleration $a_Q$ is still greater than the critical lateral acceleration $a_{QKRIT}$.

4. The method as claimed in claim 1, wherein increasing the brake pressure on the side of the trailer vehicle on the inside of the turn is carried out in small steps.

5. The method as claimed in claim 4, wherein the small steps are from 0.1 to 0.2 bar.

6. A trailer vehicle with a brake system for carrying out the method as claimed in claim 1.

7. A control unit for carrying out the method as claimed in claim 1.

8. A trailer vehicle comprising the control unit of claim 7.

* * * * *